Patented Jan. 23, 1923.

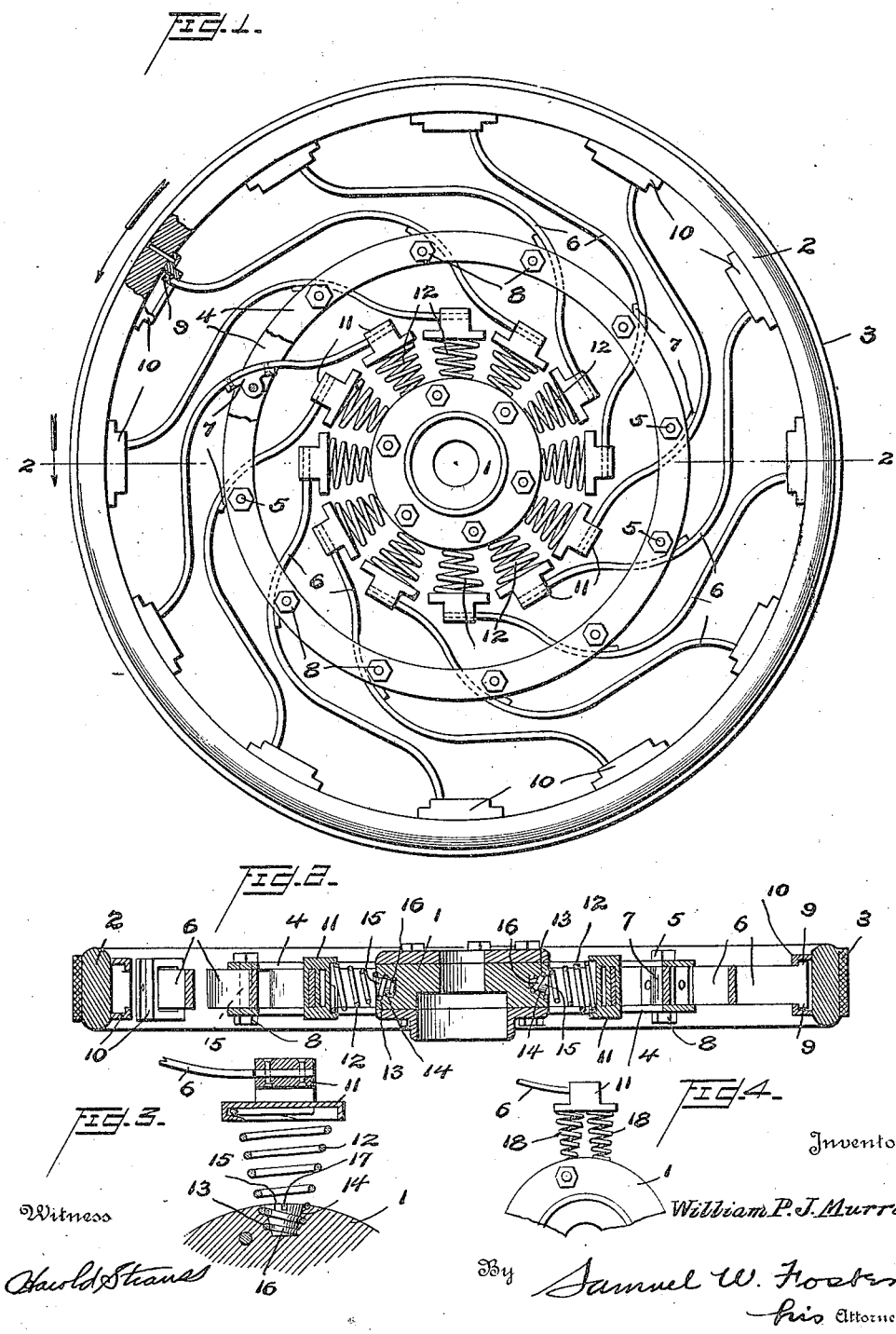

1,442,897

UNITED STATES PATENT OFFICE.

WILLIAM P. J. MURRAY, OF PHILADELPHIA, PENNSYLVANIA.

SPRING WHEEL.

Application filed August 27, 1917. Serial No. 188,541.

*To all whom it may concern:*

Be it known that I, WILLIAM P. J. MURRAY, a citizen of the United States, residing at Philadelphia, in the county of Philadelphia and State of Pennsylvania, have invented certain new and useful Improvements in a Spring Wheel, of which the following is a specification.

My invention relates to improvements in spring wheels, the object of the invention being to provide a wheel which employs a circular series of levers, having a floating fulcrum between their ends, connected at their outer ends to the felly or rim, and at their inner ends connected by springs, preferably coiled springs, with the hub, so that a jar or movement radially of the outer ends of the levers exerts a resilient radial pull on the hub in the direction in which the wheel is going by means of a spring on the end of the lever.

A further object is to provide a wheel having spokes or levers at an angle so that they exert a pull on the hub ninety degrees from the point where the pressure is applied.

A further object is to provide a spring wheel which cushions the load, and is strong and durable notwithstanding the fact that it is extremely sensitive to jars and jolts.

With these and other objects in view the invention consists in certain novel features of construction and combinations and arrangements of parts as will be more fully hereinafter described and pointed out in the claims.

In the accompanying drawings:

Figure 1 is a view in side elevation, partly in section, illustrating my improvements.

Figure 2 is a view in transverse section on the line 2—2 of Figure 1.

Figure 3 is an enlarged sectional detail view illustrating the connection between one of the springs and the hub, and Figure 4 is a detail view illustrating a modification.

1 represents the hub, and 2 the rim or felly of my improved wheel, which may have any suitable tire 3 thereon.

Between the hub 1, and rim 2, and normally concentric with both, is a pair of rings 4, 4, which latter support a circular series of bolts 5, constituting fulcrums, for a circular series of levers 6.

While I of course do not limit myself to the precise form of fulcrum shown I preferably secure a bearing bracket 7 to each lever 6, project the bolt 5 through the bearing bracket, and secure the bolt by a nut 8.

The levers 6, at their outer ends, have movable or sliding connection with the rim 2, and are preferably formed with lateral enlargements or lugs 9. which slide in elongated slotted brackets 10, secured to rim 2.

The levers 6 are preferably of the general compound curvature shown, and at their inner ends are secured to heads 11. The heads 11 are connected by coiled springs 12 with the hub 1, and the coiled springs are so secured to the heads and hub, as to insure a strong and durable connection to withstand the necessary stress thereon.

The larger outer end of each coiled spring 12 is secured in its head 11, while the smaller inner end of each spring 12 is located in a spiral groove 13, formed in a conical hole 14, which is made in hub 1. A conical plug 15 is provided with a spiral thread 16, which fits the groove 13 conforming to the inner surface of the spring, so that when the plug is screwed into place it effectually binds the spring in the groove 13 and prevents any possibility of accidental withdrawal. Each plug 15 is preferably provided with a screwdriver-receiving groove 17 to facilitate its manipulation.

Instead of employing a single spring 12, connecting each head 11 with the hub, I may employ a plurality of springs 18, as clearly shown in Figure 4.

In operation it will be noted that the movement of the outer end of each lever 6 toward the hub, causes the inner end of the lever to exert an outward radial resilient pull on the hub at ninety degrees from the point of pressure, hence each upward movement of the outer end of each lever at the base of the wheel, imparts an elastic pull on the hub in the direction of travel, which is in the direction of the arrow shown in Figure 1.

The levers are supported by floating fulcrums between the hub and the rim, which allows the levers to compensate in their movements for all variations of stress and all of the springs cooperate to sustain the load, and to insure an even distribution of the stress.

The levers may be elastic or not as preferred, but the greatest resilience is furnished by the springs.

Various slight changes may be made in the general form and arrangement of parts described without departing from my invention and hence I do not limit myself to the precise details set forth, but consider myself at liberty to make such changes and alterations as fairly fall within the spirit and scope of the appended claims.

Having fully described my invention, what I claim as new and desire to secure by Letters Patent is:

1. A spring wheel, comprising a hub, a rim, levers having resilience in a radial direction connected at one end to the rim and at their other ends to the hub, radially extending springs connecting the inner ends to the hub, and a floating member pivotally connected to all of said levers.

2. A spring wheel, comprising a hub, a rim, levers having resilience in a radial direction connected to the hub at approximately ninety degrees from their point of contact with the rim, radially extending springs between the levers and the hub, and a ring pivotally connecting the levers.

3. A spring wheel comprising a hub, a rim, a circular series of resilient levers connected with the hub and with the rim, spanning approximately 90° of the circumferential extent of the wheel and a floating member providing a fulcrum for all of the levers and located between the hub and rim.

4. A spring wheel, comprising a hub, a rim, a member located between the hub and rim, a circular series of levers connected at their outer ends slidably to the rim and between their ends to said member, and radially extending springs connecting the inner ends of the levers with the hub.

5. A spring wheel, comprising a hub, a rim, a circular series of spring levers connected at their outer ends to the rim extending at an angle to the radius, and connected at their inner ends to the hub, pivoted at an intermediate point, circumferentially, between the rim and hub, and a member located between the rim and the hub, constituting a floating fulcrum for all of said levers and to which the levers are pivoted.

6. A spring wheel, comprising a hub, a rim, a ring normally concentric with the hub and rim and located between the hub and rim, and a circular series of levers fulcrumed between their ends on the ring, and extending therefrom in opposite circumferential directions to the hub and rim, said levers connected at their outer ends to the rim so as to be movable circumferentially thereof, and resiliently connected at their inner ends to the hub.

7. A spring wheel, comprising a hub, a rim, a circular series of levers connected at their outer ends to the rim, so as to be movable circumferentially thereof, radially extending coiled springs connecting the inner ends of the levers with the hub, and a circular member around the hub to which each of said levers is fulcrumed between its ends.

8. A spring wheel, comprising a hub, a rim, a floating fulcrum member between the hub and rim, a circular series of levers fulcrumed between their ends to said member and connected at their outer ends to the rim so as to be slidable circumferentially thereof, each lever at its inner end having a head secured thereto, and a coiled spring connecting each head with the hub.

9. A spring wheel comprising a hub, a rim, a series of levers spaced at intervals about the hub and connected at their outer ends to the rim so as to be slidable circumferentially thereof, a circular floating member about the hub to which each of the levers is fulcrumed between its ends and a resilient connection between the inner end of each lever and the hub.

10. A spring wheel comprising a hub, a rim, a series of levers spaced at intervals about the hub and connected at their outer ends to the rim so as to be slidable circumferentially thereof, a circular floating member about the hub to which each of the levers is fulcrumed between its ends and a resilient tension connection between the inner end of each lever and the hub.

In testimony whereof I have signed my name to this specification in the presence of two subscribing witnesses.

WILLIAM P. J. MURRAY.

Witnesses:
KATHRYN A. SUMMERS,
AGNES M. COTTER.